S. Hagaman.
Bevelling Edges of Slates.
No. 74216      Patented Feb. 11, 1868
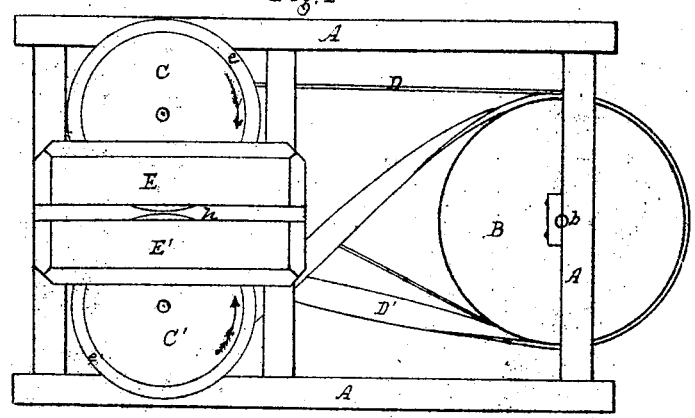
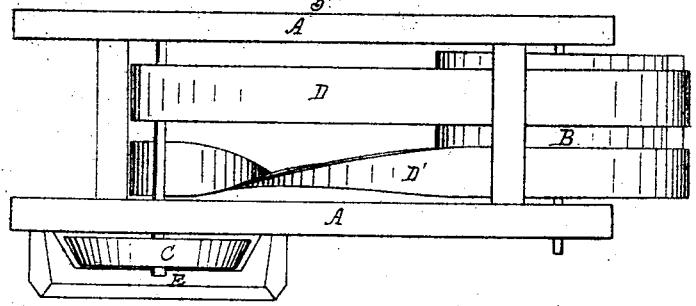
Witnesses
Jos. L. Coombs
Geo. W. McGill
Inventor
Stinson Hagaman
By J. L. Coombs
Atty.

United States Patent Office.

STINSON HAGAMAN, OF WIESSPORT, PENNSYLVANIA.

Letters Patent No. 74,216, dated February 11, 1868; antedated January 27, 1868.

IMPROVED MACHINE FOR BEVELLING EDGES OF SLATES.

The Schedule referred to in these Letters Patent and making part of the same.

TO ALL WHOM IT MAY CONCERN:

Be it known that I, STINSON HAGAMAN, of Wiessport, in the county of Carbon, and State of Pennsylvania, have invented a new and useful Machine for Bevelling the Edges of School-Slates; and I do hereby declare that the following is a full, clear, and exact description thereof, reference being had to the accompanying drawings, and the letters of reference marked thereon.

The object of my invention is to provide means for cheaply and expeditiously bevelling the edges of school-slates, so that they will fit into the grooves of the frame. In the accompanying drawings—

Figure 1 is a side elevation of my machine, and

Figure 2 is a plan view of the same.

A is the main frame of the machine. B is a drum, mounted on a shaft, $b$, to which a rotary motion is given by means of a crank, or any other suitable means. C and C' are two bevelled wheels, so located, one above the other, that their peripheries will come in contact, or nearly so, forming a V-shaped groove between them. D and D' are two belts passing round the drum B, and around smaller drums on the shafts of the bevelled wheels C and C'. D passes around the shaft of bevelled wheel C without crossing or twist, but D' crosses with a twist between the drum B and the shaft of C'. The said bevelled wheels are thus made to rotate in opposite directions, so that their peripheries, at the point of contact, or nearest approach, will move together in the same direction. E and E' are two square pieces of timber attached to the main frame, and recessed on their inner sides, so as to form spaces for the bevelled wheels to run in. A space, $h$, between these timbers, is wide enough to admit the edge of a slate, and allow the same to be moved freely therein. The bevelled surfaces $e$ and $e'$ of the wheels C and C', are coated with emery, or some equivalent sharp gritty substance.

The drum B being rotated by any suitable application of power, will cause the bevelled wheels C and C' to rotate rapidly in opposite directions, as shown by the arrows in the drawings. The edge of a slate being inserted in the space $h$, between the timbers E and E', will be expeditiously ground to the desired bevel by the wheels C and C'. The bevels of the grinding-wheels may be made concave or convex, so as to give the edges of the slate a bevel of any desired form, and said wheels should be adjustable, so as to grind the edge of the slate to any desired thickness. The timbers E and E' may also be made adjustable, to admit slates of different thicknesses. It is manifest that the bevelled grinding-wheels may be mounted on vertical shafts, instead of horizontal, without changing the principle of the machine.

What I claim as my invention, and desire to secure by Letters Patent, is—

1. The bevelled grinding-wheels, arranged and operating substantially as and for the purpose described.

2. In combination with the bevelled grinding-wheels, I claim the guide-timbers E E', arranged substantially as and for the purpose described.

3. I claim, in combination, the drum B, the belts D and D', the bevelled wheels C and C', and the guide timbers E and E', all arranged and operating substantially as described.

STINSON HAGAMAN.

Witnesses:
    M. W. RAUDENBUSH,
    R. N. HOFFORD.